United States Patent
Daily

(10) Patent No.: US 8,181,865 B2
(45) Date of Patent: May 22, 2012

(54) RADIO FREQUENCY IDENTIFICATION POINT OF SALE UNASSISTED RETAIL TRANSACTION AND DIGITAL MEDIA KIOSK

(75) Inventor: Michael A. Daily, Claremont, NC (US)

(73) Assignee: Freedom Shopping, Inc., Hickory, NC (US)

( * ) Notice: Subject to any disclaimer, the term of this patent is extended or adjusted under 35 U.S.C. 154(b) by 608 days.

(21) Appl. No.: 12/107,727

(22) Filed: Apr. 22, 2008

(65) Prior Publication Data

US 2008/0266099 A1  Oct. 30, 2008

Related U.S. Application Data

(63) Continuation-in-part of application No. 12/013,255, filed on Jan. 11, 2008.

(60) Provisional application No. 60/925,972, filed on Apr. 24, 2007.

(51) Int. Cl.
*G06K 15/00* (2006.01)
*G06K 5/00* (2006.01)
*G06K 7/00* (2006.01)
*G06Q 30/00* (2012.01)

(52) U.S. Cl. ......... 235/383; 235/380; 235/385; 235/439

(58) Field of Classification Search ................. None
See application file for complete search history.

(56) References Cited

U.S. PATENT DOCUMENTS

| | | | |
|---|---|---|---|
| 5,238,968 A | 8/1993 | Morita et al. | |
| 5,500,650 A | 3/1996 | Snodgrass et al. | |
| 5,627,544 A | 5/1997 | Snodgrass et al. | |
| 5,745,036 A | 4/1998 | Clare | |
| 5,963,134 A | 10/1999 | Bowers et al. | |
| 5,974,078 A | 10/1999 | Tuttle et al. | |
| 6,025,780 A | 2/2000 | Bowers et al. | |
| 6,101,483 A | 8/2000 | Petrovich et al. | |
| 6,147,604 A | 11/2000 | Wiklof et al. | |
| 6,169,483 B1 | 1/2001 | Ghaffari et al. | |

(Continued)

FOREIGN PATENT DOCUMENTS

JP  08-221661  8/1996

(Continued)

OTHER PUBLICATIONS

"Agility RFID Technology"; http://www.ittc.ku.edu/agility/.

(Continued)

*Primary Examiner* — Fahd Obeid

(74) *Attorney, Agent, or Firm* — Snell & Wilmer LLP

(57) ABSTRACT

The invention relates to a self-checkout system that selectively activates an alarm when an item is determined to be stolen, engages the user regarding the purchase of the item, and informs the user of the purchase status of the item. When an item is determined to be stolen, and a number of occurrences of the item in the database indicating it is stolen is greater than a predetermined amount over a predetermined period of time, a theft detection module does not transmit a security signal to activate an alarm. The invention can also include a touch-screen display including a first portion dedicated to displaying POS transactions and online shopping and a second portion dedicated to displaying interactive digital media related to the item. Furthermore, the invention can include indicators on the touch screen display to indicate the status of an item.

23 Claims, 5 Drawing Sheets

U.S. PATENT DOCUMENTS

| | | |
|---|---|---|
| 6,294,998 B1 | 9/2001 | Adams et al. |
| 6,459,726 B1 | 10/2002 | Ovard et al. |
| 6,486,783 B1 | 11/2002 | Hausladen et al. |
| 6,497,362 B2 | 12/2002 | Persky et al. |
| 6,507,279 B2 | 1/2003 | Loof |
| 6,547,040 B2 | 4/2003 | Goodwin, III |
| 6,554,187 B2 | 4/2003 | Otto |
| 6,557,760 B2 | 5/2003 | Goodwin, III |
| 6,598,790 B1 | 7/2003 | Horst |
| 6,598,791 B2 | 7/2003 | Bellis, Jr. et al. |
| 6,648,232 B1 | 11/2003 | Emmert |
| 6,651,053 B1 | 11/2003 | Rothschild |
| 6,825,766 B2 * | 11/2004 | Hewitt et al. ............... 340/572.7 |
| 6,837,436 B2 | 1/2005 | Swartz et al. |
| 6,868,073 B1 | 3/2005 | Carrender |
| 6,883,710 B2 | 4/2005 | Chung |
| 6,940,408 B2 | 9/2005 | Ferguson et al. |
| 6,967,563 B2 | 11/2005 | Bormaster |
| 6,975,229 B2 | 12/2005 | Carrender |
| 6,994,252 B2 | 2/2006 | Frich |
| 7,005,988 B2 | 2/2006 | Mathewson, II et al. |
| 7,040,541 B2 | 5/2006 | Swartz et al. |
| 7,045,179 B2 | 5/2006 | Mizutani et al. |
| 7,107,221 B1 | 9/2006 | Tracy et al. |
| 7,108,183 B1 | 9/2006 | Cox, Jr. |
| 7,113,088 B2 | 9/2006 | Frick et al. |
| 7,123,146 B1 | 10/2006 | Holtzman |
| 7,133,843 B2 | 11/2006 | Hansmann et al. |
| 7,150,395 B1 | 12/2006 | White |
| 7,156,303 B1 | 1/2007 | Holtzman |
| 7,170,415 B2 | 1/2007 | Forster |
| 7,183,928 B2 | 2/2007 | Redlin |
| 7,185,809 B2 | 3/2007 | Barton et al. |
| 7,187,289 B2 | 3/2007 | Eckstein et al. |
| 7,221,269 B2 | 5/2007 | Onderko et al. |
| 7,259,678 B2 | 8/2007 | Brown et al. |
| 7,315,248 B2 | 1/2008 | Egbert |
| 7,325,734 B2 | 2/2008 | Howarth et al. |
| 7,328,170 B2 | 2/2008 | Jacobs et al. |
| 7,416,117 B1 | 8/2008 | Morrison |
| 7,463,156 B2 | 12/2008 | Baba et al. |
| 7,466,232 B2 | 12/2008 | Neuwith |
| 7,522,051 B2 | 4/2009 | Sanari et al. |
| 7,629,063 B2 | 12/2009 | Yamamoto et al. |
| 7,652,636 B2 | 1/2010 | Forster et al. |
| RE41,531 E | 8/2010 | Wood, Jr. |
| 2001/0000019 A1 | 3/2001 | Bowers et al. |
| 2002/0096564 A1 | 7/2002 | Bellis, Jr. et al. |
| 2002/0139617 A1 | 10/2002 | Goodwin, III |
| 2002/0186133 A1 | 12/2002 | Loof |
| 2003/0122667 A1 | 7/2003 | Flynn |
| 2003/0135417 A1 | 7/2003 | Bodin |
| 2003/0174051 A1 | 9/2003 | Naitou |
| 2004/0018227 A1 | 1/2004 | Park et al. |
| 2004/0103034 A1 | 5/2004 | Reade et al. |
| 2004/0143505 A1 | 7/2004 | Kovach |
| 2004/0220860 A1 * | 11/2004 | Persky et al. ................... 705/23 |
| 2005/0027611 A1 | 2/2005 | Wharton |
| 2005/0040934 A1 | 2/2005 | Shanton |
| 2005/0049914 A1 | 3/2005 | Parish |
| 2005/0073417 A1 * | 4/2005 | Mathewson et al. ....... 340/572.1 |
| 2005/0140512 A1 | 6/2005 | Sakama et al. |
| 2005/0167493 A1 | 8/2005 | Barton et al. |
| 2005/0173527 A1 | 8/2005 | Conzola |
| 2005/0237953 A1 | 10/2005 | Carrender et al. |
| 2005/0269407 A1 | 12/2005 | Harmon |
| 2006/0016885 A1 | 1/2006 | Roberts et al. |
| 2006/0022825 A1 | 2/2006 | Carrender |
| 2006/0054710 A1 | 3/2006 | Forster et al. |
| 2006/0122934 A1 | 6/2006 | White et al. |
| 2006/0138220 A1 | 6/2006 | Persky |
| 2006/0145927 A1 | 7/2006 | Choi et al. |
| 2006/0175402 A1 | 8/2006 | Maitin |
| 2006/0231611 A1 | 10/2006 | Chakiris et al. |
| 2006/0231616 A1 | 10/2006 | Gibault |
| 2006/0255945 A1 | 11/2006 | Egbert |
| 2006/0266824 A1 | 11/2006 | Hassenbuerger |
| 2006/0278704 A1 | 12/2006 | Saunders et al. |
| 2006/0289637 A1 * | 12/2006 | Brice et al. ..................... 235/385 |
| 2007/0008138 A1 | 1/2007 | Mosher, Jr. et al. |
| 2007/0034692 A1 | 2/2007 | Johnson |
| 2007/0061210 A1 | 3/2007 | Chen et al. |
| 2007/0069011 A1 | 3/2007 | Barton et al. |
| 2007/0075861 A1 | 4/2007 | Cook et al. |
| 2007/0102513 A1 | 5/2007 | Scheb |
| 2007/0114279 A1 | 5/2007 | Lessing et al. |
| 2007/0124216 A1 | 5/2007 | Lucas |
| 2007/0126588 A1 | 6/2007 | Mess |
| 2007/0164868 A1 | 7/2007 | Deavours et al. |
| 2007/0194993 A1 | 8/2007 | Deavours et al. |
| 2007/0195003 A1 | 8/2007 | Deavours et al. |
| 2008/0011836 A1 * | 1/2008 | Adema et al. ................. 235/383 |
| 2008/0024305 A1 | 1/2008 | Deavours |
| 2008/0131133 A1 | 6/2008 | Blunt et al. |

FOREIGN PATENT DOCUMENTS

| | | |
|---|---|---|
| JP | 2001-076261 | 3/2001 |
| JP | 2001-103453 | 4/2001 |
| JP | 2001-325647 | 11/2001 |
| JP | 2005284671 | 10/2005 |
| JP | 200822161 | 9/2008 |

OTHER PUBLICATIONS

Collins, Jonathan; "Avery Designs Passive UHF Tag for Metal"; RFID Journal, 2 pages; Mar. 9, 2005.

http://starportech.com/products/metal_mount_tags.html; Apr. 15, 2010.

Swedberg, Clarie; "University of Kansas' Tag for Metal, Liquids"; RFID Journal, 2 pages; Apr. 19, 2006.

"Agility: Foam Based RFID Tags Can Work With Liquids and Metals"; www.rfid-weblog.com; 5 pages; Jul. 2, 2008.

Bacheldor, Beth; "University of Kansas Lab Develops Foam-Attached Tag", RFID Journal, 2 pages; Jun. 24, 2008.

Bacheldor, Beth; "New RFID Products for Coping with Metal"; RFID Journal, 2 pages; Jun. 29, 2006.

http://www.idplate.com/rfid-tags-labels/rfid-asset-products/metal-mount-rfid-tag/default.html.

"UHF KU RFID Tag"; University of Kansas Information & Telecommunication Technology Center; 2 pages.

Wille; Evaluation and Optimization of RFID Transition Control Strategies, Mar. 2005, pp. 1-3.

\* cited by examiner

US 8,181,865 B2

RADIO FREQUENCY IDENTIFICATION POINT OF SALE UNASSISTED RETAIL TRANSACTION AND DIGITAL MEDIA KIOSK

CLAIM OF PRIORITY UNDER 35 U.S.C. §119

The present Application for Patent is a continuation-in-part of U.S. patent application Ser. No. 12/013,255 entitled "SMART RFID CHECKOUT KIOSK," filed on Jan. 11, 2008, and claims priority to U.S. Provisional Patent Application No. 60/925,972 entitled "Radio Frequency Identification Point of Sale Unassisted Retail Transaction and Digital Media Kiosk" filed on Apr. 24, 2007, both of which are assigned to the assignee hereof and hereby expressly incorporated by reference herein.

BACKGROUND

FIELD

The invention relates to radio frequency identification point of sale unassisted retail transaction and digital media kiosk.

BACKGROUND

In a checkout kiosk with a security gate, when an item is determined to be stolen, an alarm in the security gate is often activated. However, the same item can be detected and processed multiple times within a short amount of time despite the fact that the alarm is already activated or that the item stolen is known. This is problematic because detecting and processing the same item wastes available resources.

Furthermore, checkout kiosks are often static and do not provide the patron with information related to the item that the patron is purchasing. This could prevent the patron from receiving valuable information regarding the item and inhibit his or her ability to fully acquire all of the items he or she wants and also prevents a store from maximizing the sale of the item or related items.

In addition, checkout kiosks often do not provide clear indication of when an item has been purchased. Thus, a patron may accidentally leave the store thinking he has purchased an item without actually purchasing the item. Furthermore, the patron may have purchased the item, but without the checkout kiosk actually acknowledging the purchase. Thus, the patron may not intend to steal the item or may not have stolen the item yet the security kiosk will be activated unexpectedly for the patron.

Therefore, a need exists in the art for techniques for a system that selectively activates an alarm when an item is determined to be stolen, engages the user regarding the purchase of the item, and informs the user of the purchase status of the item.

SUMMARY

In one embodiment, the invention is a self-checkout apparatus for detecting an RFID tag may include a main housing having a first non-metallic panel, a first RF antenna positioned adjacent the first non-metallic panel to transmit a TX signal toward an RFID tag corresponding to an item and to receive a RX signal from the RFID tag, a first RFID reader connected to the first RF antenna, positioned in the main housing, to detect an RFID tag using the RX signal, a remote housing having a second non-metallic panel, a second RF antenna positioned adjacent to the second non-metallic panel to transmit a TX signal toward the RFID tag and to receive a RX signal from the RFID tag, and a second RFID reader connected to the second RF antenna, positioned in the remote housing, to receive the RX signal from the RFID tag.

The self-checkout apparatus may also include a theft detection module connected to the first RFID reader and the second RFID reader to determine whether the RFID tag has been processed for sale when the RX signal from the RFID tag is received by the second RFID reader, and an alarm connected to the theft detection module.

When the RFID tag has not been processed for sale when the RX signal from the RFID tag is received by the second RFID reader, the theft detection module transmits a security signal to activate the alarm and the theft detection module receives a description of an item with the RFID tag.

Furthermore, when the RFID tag has not been processed for sale when the RX signal from the RFID tag is received by the second RFID reader, the theft detection module stores in a database the description of the item with the RFID tag.

Also, when the RFID tag has not been processed for sale when the RX signal from the RFID tag is received by the second RFID reader, the theft detection module stores in a database a current time and associates the current time with the description of the item with the RFID tag.

In addition, when the RFID tag has not been processed for sale when the RX signal from the RFID tag is received by the second RFID reader, and when the number of occurrences of the description of the item in the database is greater than a predetermined amount over a predetermined period of time, the theft detection module does not transmit the security signal to activate the alarm.

The invention can also include a touch-screen display connected to the first RFID reader and the second RFID reader, the touch-screen display including a first portion dedicated to displaying POS transactions and online shopping and a second portion dedicated to displaying interactive digital media related to the item. Furthermore, the invention can include indicators on the touch screen display to indicate the status of an item.

In another embodiment, the invention is method for activating an alarm when an item is stolen by transmitting a first signal to an RFID tag, receiving a second signal from the RFID tag, determining the description of an item associated with the RFID tag using the second signal, storing the description of the item associated with the RFID tag in a database if the item is stolen and activating an alarm if a number of occurrences of the description of the item in the database is less than a predetermined amount over a predetermined period of time.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Apparatus, systems and methods that implement the embodiments of the various features of the invention will now be described with reference to the drawings. The drawings and the associated descriptions are provided to illustrate some embodiments of the invention and not to limit the scope of the invention. Throughout the drawings, reference numbers are re-used to indicate correspondence between referenced elements.

Figure 1:
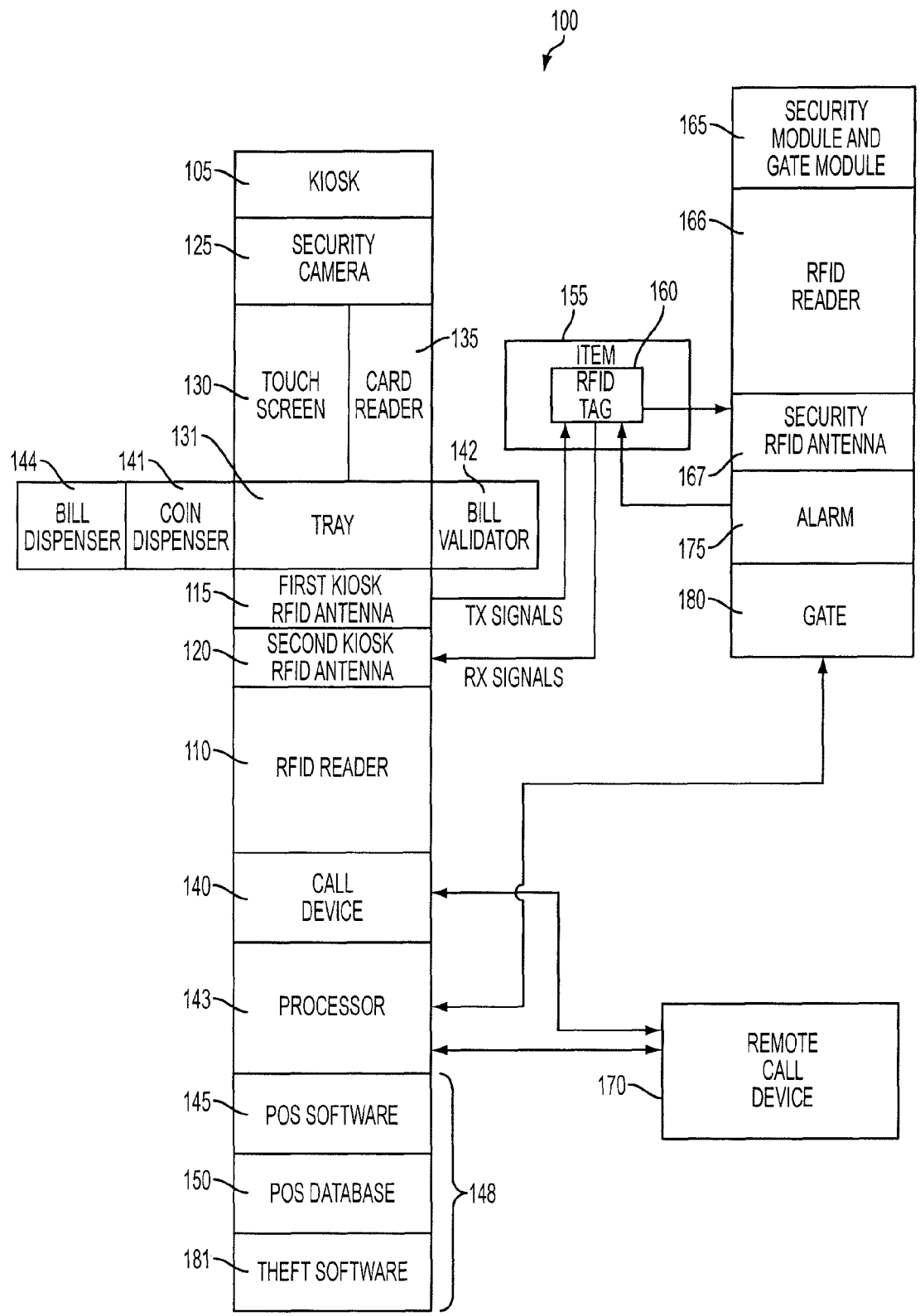
FIG. 1 is a block diagram of a self-checkout kiosk system for reading an RFID tag according to an embodiment of the invention.

FIG. 1 is a block diagram of a self-checkout kiosk system 100 for reading an RFID tag according to an embodiment of the invention. System 100 and the components of system 100 may be implemented using hardware, software, firmware, middleware, microcode, or any combination thereof. One or more components can be rearranged and/or combined, and other systems can be used in place of system 100 while still maintaining the spirit and scope of the invention. Additional components may be added to system 100 or may be removed from system 100 while still maintaining the spirit and scope of the invention. The components of the system 100 may be connected to each other using wireless and/or wired connections.

As seen in FIG. 1, system 100 includes a kiosk or point-of-sale (POS) device 105, a RFID tag 160, a remote call device 170, and a security and gate module 165. RFID tag 160 can be located on an item 155.

Kiosk 105 includes a security camera 125, a RFID reader 110, a security camera 125, a touch screen display 130, a card reader 135, a bill validator 142, a tray 131, a coin dispenser 141, a bill dispenser 144, a first kiosk RFID antenna 115, a second kiosk RFID antenna 120, a RFID reader 110, a call device 140, a processor 143, a memory 148, POS software 145, POS database 150, and theft software 181.

Figure 2:
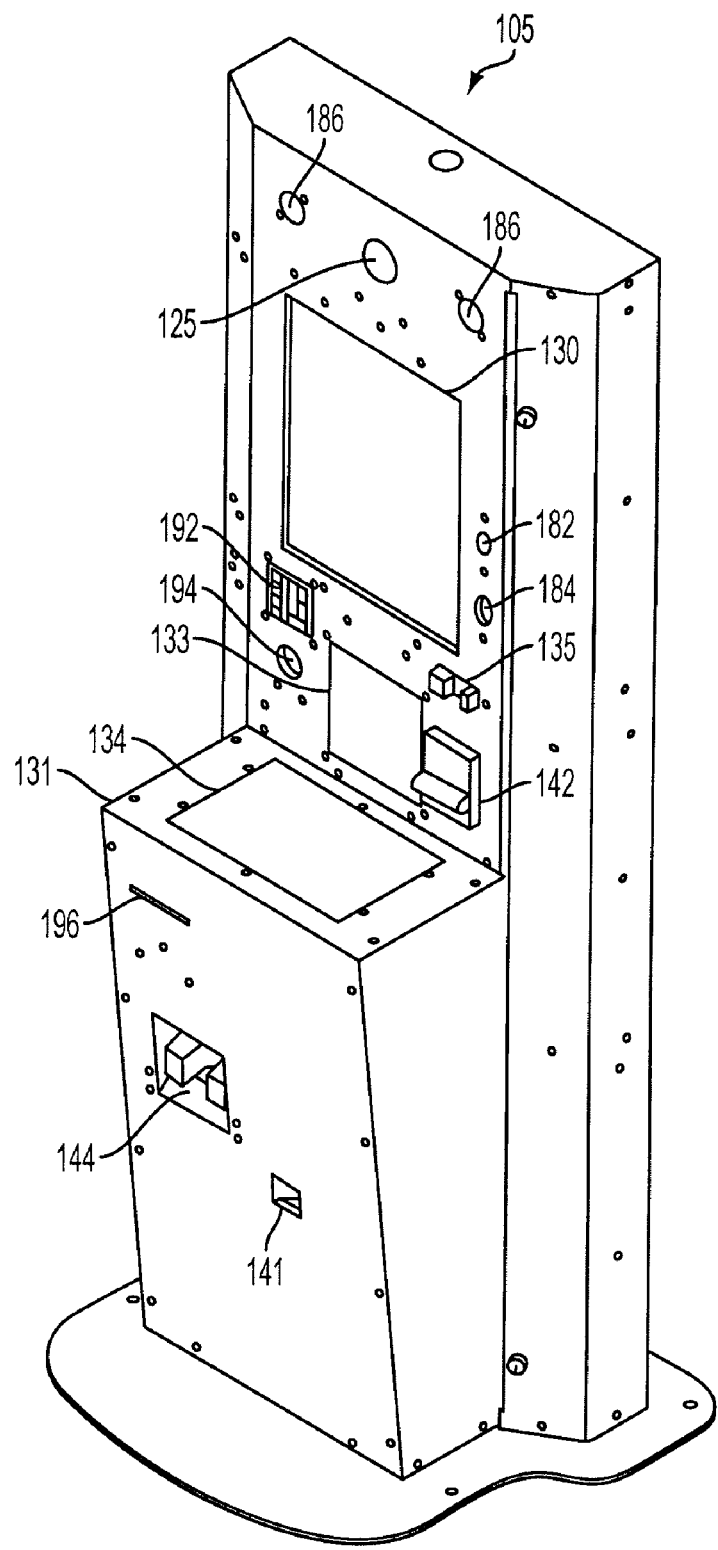
FIG. 2 is a front perspective view of the self-checkout kiosk of FIG. 1 according to an embodiment of the invention.

FIG. 2 is a front perspective view of the self-checkout kiosk of FIG. 1. As seen in FIG. 2, kiosk 105 can also include speakers 186, a microphone 182, a fingerprint reader 184, a cash card pin pad 192, a first non-metallic panel 133, and a second non-metallic panel 134.

Figure 3:
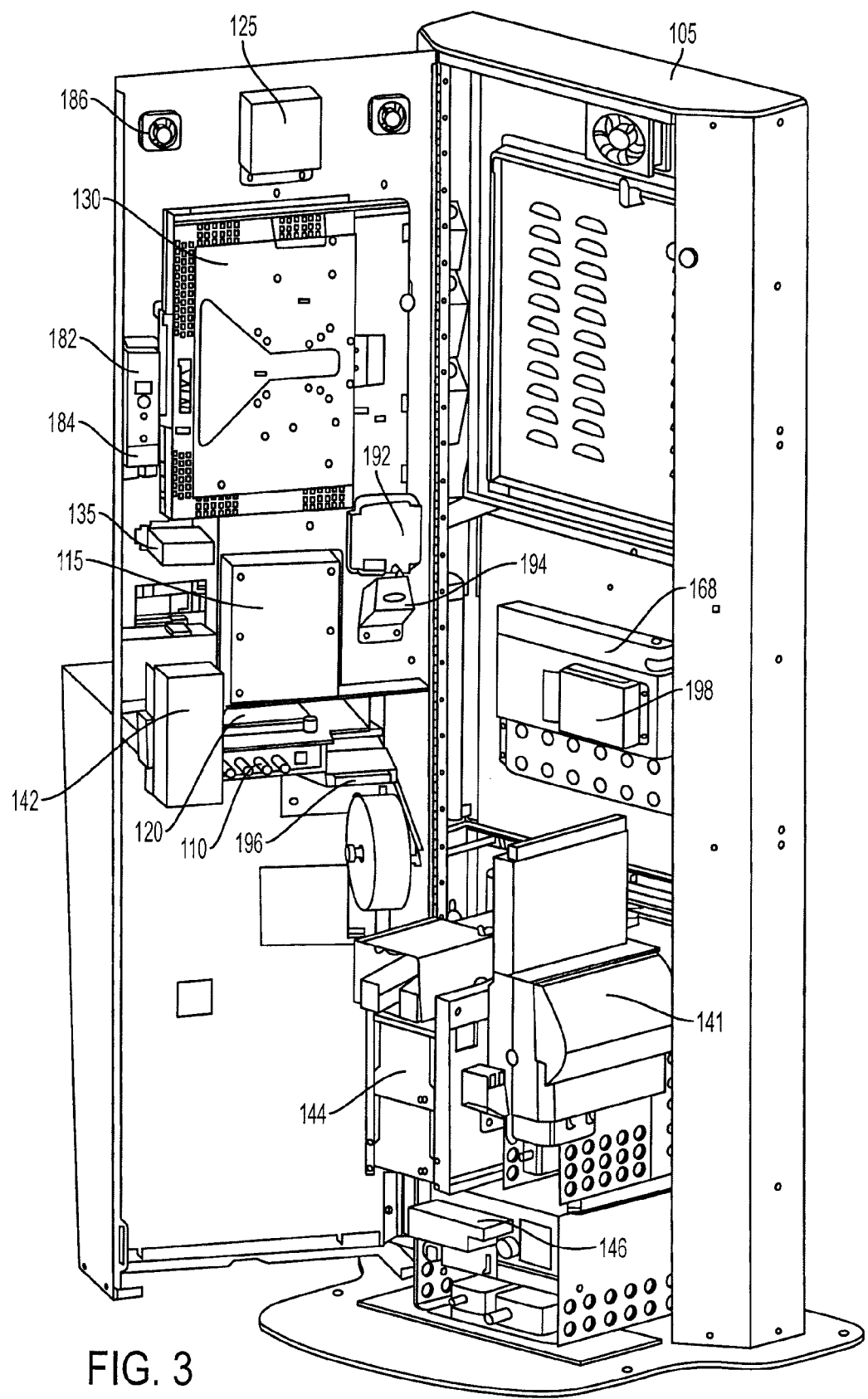
FIG. 3 is a perspective view of the self-checkout kiosk of FIG. 1 according to an embodiment of the invention.

FIG. 3 is a perspective view of the self-checkout kiosk of FIG. 1. As seen in FIG. 3, kiosk 105 can also include a wireless router 168, a network switch 198, and a computer 146.

Figure 4:
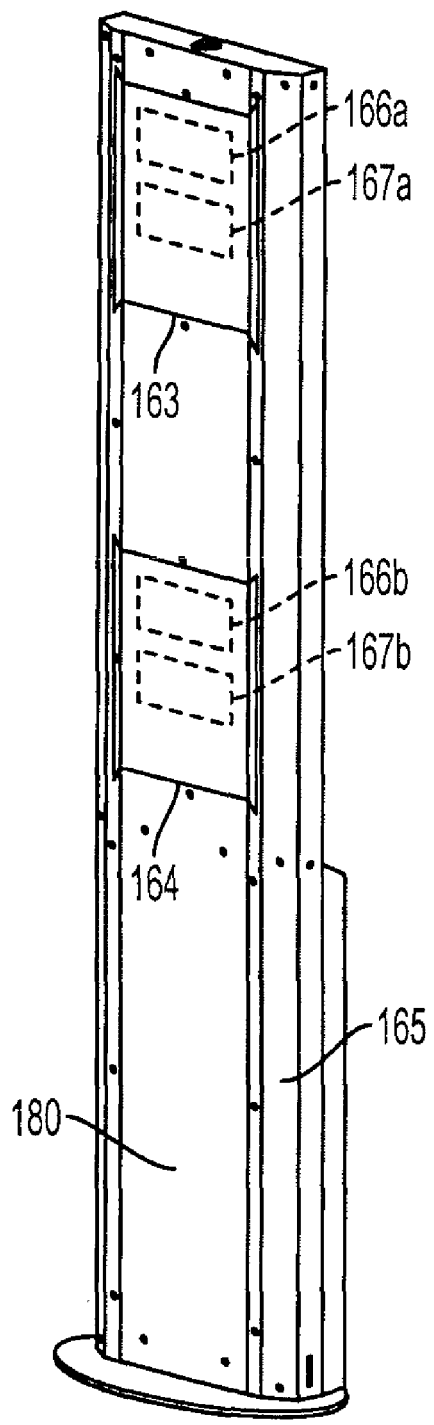
FIG. 4 is a front perspective view of the security module and gate module of FIG. 1 according to an embodiment of the invention.
Figure 5:
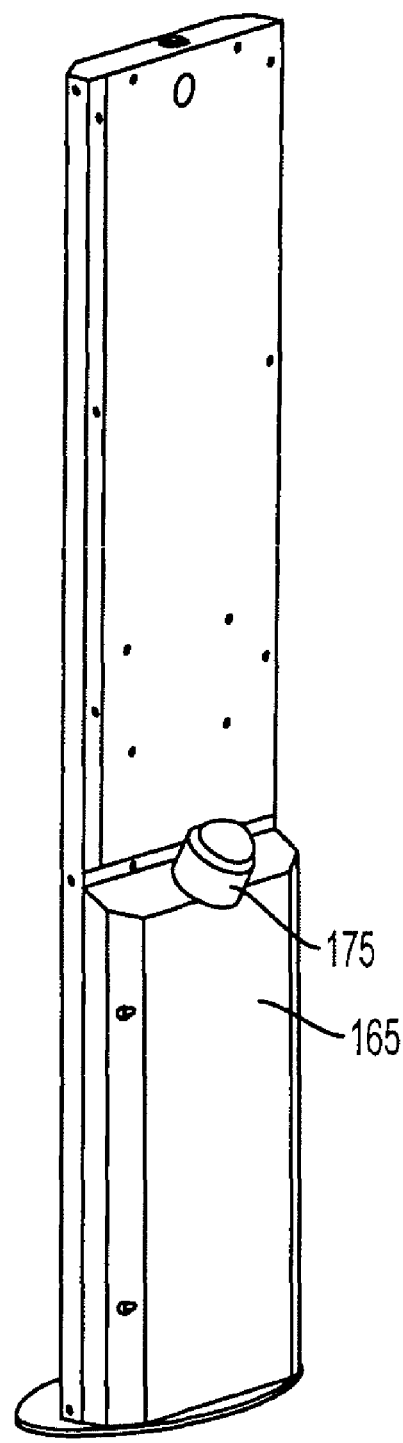
FIG. 5 is a rear perspective view of the security module and gate module of FIG. 1 according to an embodiment of the invention.

As seen in FIG. 1, security module and gate module 165 includes a RFID reader 166, a security RFID antenna 167, an alarm 175, and a security gate 180. FIGS. 4 and 5 are front and rear perspective views of the security module and gate module 165 of FIG. 1. As seen in FIGS. 4 and 5, security and gate module 165 also includes third non-metallic panel 163 and fourth non-metallic panel 164.

Referring now to FIGS. 1-5, system 100 may be used to illustrate the apparatus and methods described herein for locating and detecting an RFID tag 160 and using theft software 181 to determine whether any items have been stolen. System 100 can then detect when a patron fails to pay for item 155 and activate alarm 175 indicating that item 155 has not been paid for. Thus, system 100 advantageously provides kiosk 105 with POS software 145, theft software 181, remote management using remote call device 170, RFID readers 110 and 166, and security camera 125 functioning harmoniously for an automatic self-checkout that is theft deterrent.

Processor 143 is connected to security camera 125, touch screen 130, card reader 135, bill validator 142, coin dispenser 141, bill dispenser 144, RFID reader 110, speakers 186, microphone 182, fingerprint reader 184, cash card pin pad 192, call device 140, memory 148, RFID reader 166, and alarm 175. Memory 148 can store POS software 145, POS database 150, and theft software 181. Processor 143 and memory 148 can be located within computer 146.

Some advantages of the system 100 include increased speed of transactions, better quality of service and overall patron satisfaction with the selling process without the need for checkout personnel to be located at the immediate location of the kiosk 105, and theft software 181 for determining whether the item 155 has been paid for and if not, activating the alarm 175 and recording a description (e.g., item name, number or description) of the item 155 that was stolen for inventory management.

Kiosk 105 is a device that allows a patron to use touch screen display 130 to purchase items 155 detected by RFID reader 110. One advantage of kiosk 105 is its overall small footprint size. Kiosk 105 and security module and gate module 165 can be small enough to use in a confined area.

Kiosk 105 may include a housing having a cavity that holds the electronic components. The housing may be an armature made of a material that allows passage of RF signals. In one embodiment, the housing is made out of a metallic material such as steel, iron, aluminum, etc.

Tray 131 is used by patrons as a convenient location to place items 155 for checkout and can include an aperture in a middle of tray 131. First non-metallic panel 134 can be located such that it covers the aperture of tray 131 and is a part of tray 131 or cooperates with tray 131 to form a substantially smooth surface with tray 131 for patrons to place items 155 for checkout. Second non-metallic panel 133 is located substantially perpendicular to first non-metallic panel 134. Tray 131 can be a metallic material or non-metallic material and does not have to be the same material as non-metallic panel 133.

First kiosk RFID antenna 115 is located behind first non-metallic panel 134 and second kiosk RFID antenna 120 is located behind second non-metallic panel 134. Both first kiosk RFID antenna 115 and second kiosk RFID antenna 120 are connected to RFID reader 110. Although, two RFID antennas are connected to RFID reader 110, it is contemplated that any number of RFID antennas can be connected to RFID reader 110. By mounting first kiosk RFID antenna 115 behind first non-metallic panel 134, first kiosk RFID antenna 115 can advantageously face upwards perpendicularly through tray 131 and facilitate detection of RFID tag 160.

Security RFID antenna 167 can be comprised of security RFID antenna 167a and security RFID antenna 167b which are connected to RFID reader 166. Likewise, security RFID antenna 167a and 167b can be located behind third and fourth non-metallic panels 163 and 164, respectively.

First, second, third, and fourth non-metallic panels 133, 134, 163, and 164 respectively allow the passage of RF signals. In one embodiment, first, second, third, and fourth non-metallic panels 133, 134, 163, and 164 respectively allow the passage of RF signals at a frequency of about 915 MHz. Since metallic material may hamper the ability of RF signals to traverse to a desired location, the use of first, second, third, and fourth non-metallic panels 133, 134, 163, and 164 is beneficial in allowing the RF signals to interact with each RFID tag 160. It is contemplated that first, second, third, and fourth non-metallic panels 133, 134, 163, and 164 could be comprised of acrylic, plastic, glass, fiberglass, or any other type of material that would substantially allow RF signals to pass through.

Security gate 180 may be comprised of an armature made of a material that allows passage of RF signals such as acrylic, plastic, glass, fiberglass. Furthermore, security gate 180 may be comprised of the same material as third and fourth non-metallic panels 163 and 164 or of a completely different material.

In one embodiment, POS software can control RFID reader 110 to scan item 155 for purchase by the patron by sending a TX signal to RFID tag 160 and receiving a RX signal from RFID tag 160 using antennas 115 and/or 120. POS software 145 can then store a description of item 155 in POS database 150 and indicate that item 155 has been purchased. It is contemplated that items 155 could be placed on tray 131 and only items 155 within tray 131 would be checked out or scanned for purchase.

Theft software 181 can detect and identify each RFID tag 160 by sending a TX signal to RFID tag 160 and receiving a RX signal from RFID tag 160 using antenna 167. Theft software 181 can also determine if item 155 associated with RFID tag 160 has been purchased or not. If item 155 has not been purchased, it is considered stolen. If item 155 is stolen theft software 181 can identify by item names or numbers the specific items 155 that were stolen and store the item names or numbers along with a time stamp and/or date stamp in POS database 150.

POS software 145 and theft software 181 control the operations and functions of RFID readers 110 and/or 166 and it is contemplated that they can be interchangeable and/or combined.

POS database 150 may include two databases. The first database may be a Microsoft SQL Server Database that contains the entire local inventory of tagged items 155 or products. The second database may be a Microsoft SQL Server Database that contains all transactions completed at the kiosk 105 and a list of all stolen items 155. POS Database 150 can also contain information about items 155 including interactive digital media that is associated with items 155. The second database can be remotely accessed by employees or managers to conduct inventory management. Both databases are synchronized by a separate program that monitors the operation of the kiosk 105 and the security module and gate module 165. POS software 145 allows for multiple payment methods that can be turned on or off. The item number, name, price, and discount amount for each item 155 is stored in POS database 150.

POS software 145, theft software 181, and POS database 150 can be located in memory 148 or in separate memory modules in kiosk 105 or security and gate module 165.

In one embodiment, touch screen display 130 is a 19" display and more specifically it is an inverted 19" SVGA LCD touch screen display. Touch screen display 130 can be any size and be any type of display such as a plasma display panel. It is also contemplated that touch screen display 130 can be rotated approximately 90 degrees or any other degree suitable for viewing.

Touch screen display 130, which is controlled by processor 143, allows an employee to input or scan the details of each item 155 into POS database 150. In addition, touch screen display 130 may be used to view all the purchased items 155, price of each item 155, and any discount applied to each item 155.

In one embodiment, touch screen display 130 is segregated into a first portion 138 and a second portion 136. First portion 138 can comprise approximately 60% of touch screen display 130 and can be dedicated to POS transactions and/or online shopping. Second portion 136 can comprise approximately 40% of touch screen display 130 and can be dedicated to interactive digital media. It is contemplated that first portion 138 and second portion 136 can comprise any alternative percentage of touch screen display 130. Furthermore, although FIG. 2 depicts first portion 138 below second portion 136, it is appreciated that first portion 138 could be above second portion 136 or to the left or right of second portion 136.

When POS software 145 determines that an interactive digital media event is associated with item 155, it can display the interactive digital media such as an advertisement on second portion 136 of touch screen display 130. Based on the information in the POS database 150, a patron may press a location on touch screen display 130 after a specific item 155 is detected to open an Internet browser in first portion 138 of touch screen display 130 and order related items 155 not present and only available by delivery.

Security camera 125 may be located on kiosk 105 and/or security module and gate module 165. Furthermore security camera 125 could be located at a remote location away from kiosk 105 and/or security module and gate module in order to enable optimal video capture of the patron. It is also contemplated that one or more security camera 125 may be used in the invention.

Computer 146 may be a standard PC with sufficient IO ports to accommodate the ancillary electronic connections and touch screen display 130. Computer 146 and touch screen display 130 are the main interfaces between the kiosk 105 and the patron. Computer 146 may store computer instructions on a machine readable medium for controlling the operations and functions of the various components of the kiosk 105. Computer 146 may include one or more memory modules such as memory 148 for storing instructions to control the operations and functions of the various components of the kiosk 105. The term "machine readable medium" includes, but is not limited to, random access memory (RAM), flash memory, read-only memory (ROM), EPROM, EEPROM, registers, hard disk, removable disk, CD-ROM, DVD, wireless channels, and various other mediums capable of storing, containing or carrying instruction(s) and/or data.

Processor 143 within computer 146 executes POS software 145 and/or theft software 181. Processor 143 may utilize software written in Microsoft Visual Studio which is compiled to create POS software 145 that interfaces with RFID reader 110. POS software 145 also allows programming of RFID tags 160 and stocking of the shelves using kiosk 105 without the need for additional software. Processor 143 may be an Advanced RISC Machine (ARM), a controller, a digital signal processor (DSP), a microprocessor, or any other device capable of processing instructions.

Router 168 can be, for example, a 4-port Linksys wireless router. Router 168 can be connected to, for example, a cable modem or a DSL connection.

Card reader 135 is a standard POS, Inc. keyboard wedge and is mounted on kiosk 105 and emulates keyboard entries. Card reader 135 can be, for example, a magnetic card swipe and therefore POS software 145 and card reader 135 can be used with any card with a magnetic strip. POS software 145 segregates the input of the credit card when the credit card is swiped in card reader 135 and uses the information from the credit card obtained by card reader 135 for credit card approvals. POS software can use 911 software to consummate a purchase of item 155 by the patron using the credit card. 911 software uses an Internet connection and a load authorization server service running on processor 143 to deliver an instant approval code and thereafter to deliver batch load transactions to a bank merchant account.

Receipt printer 196 is a SWECOIN TTP 2020 mounted on kiosk 105. It is contemplated, however, that receipt printer 196 could be any type of printer including various types of inkjet and laser printers of any size and shape. Standard print commands are processed from POS software 145. In one embodiment, a second wireless printer may be utilized.

In operation, kiosk 105 allows a patron to purchase items 155 that have been tagged with RFID tag 160 and that have data associated with items 155 stored in the POS database 150. In one embodiment, a patron may approach kiosk 105 and place items 155 onto tray 131. Kiosk 105 then automatically detects and identifies each item 155 belonging to the patron using RFID reader 110 and antennas 115 and/or 120, and conducts a self-checkout process.

POS software 145 consummates the sale of the items 155 initiated by the patron. Identification information of items 155 is compared to the POS database 150, which contains pertinent information about each item 155, such as price of item 155, and the patron can view details, advertisements, prices and discounts related to each item 155.

For example, if there is a discount for a purchase of two items, POS software 145 can indicate it on touch screen display 130 and display on second portion 136 of touch screen display 130 an advertisement related to the item 155. This beneficially allows the patron to add additional items to the purchase related to the advertisement. During the advertisement, the patron may have a choice to obtain more information by touching the screen in an area of touch screen display 130 indicated by POS software 145 to order additional items not present which do not contain RFID tag for delivery.

To complete the purchase of items 155, the patron can pay, for example, by credit card using card reader 135. If the patron pays by a cash card, the patron can swipe the cash card through card reader 135 and the authenticity of the patron can be further verified through cash card pin pad and/or fingerprint reader 184. The patron could also charge the purchase to a patron's specific location, such as a hotel room, by entering a room number or other identifying information. Cash card purchases are available by utilizing the card reader 135 or biometric interfaces such as fingerprint reader 184 and associating inserted cash with a store value account. Furthermore, the patron could also pay by depositing cash in bill validator 142 and receiving change through coin dispenser 141 and/or bill dispenser 144. Once a patron has finished purchasing the item, a receipt can be printed by receipt printer 196 or any other printer or wireless printer.

During the checkout process, POS software 145 also allows 4 small colored indicator circles displayed in the lower left corner of touch screen display 130 which represent antennas from kiosk 105 and security module 165. If the indicator circle is a first predetermined color such as clear, this could indicate that no RFID tag 160 has been detected. If the indicator circle is a second predetermined color such as yellow, then the RFID tag 160 is being detected by the RFID Reader 110 or 166 but the tag in not in the POS database 150. If the indicator circle is a third predetermined color such as red, this indicates detection of the RFID tag 160 and the RFID tag is 160 in the POS database 150, but not yet checked-out. If the indicator circle is a fourth predetermined color such as green, this indicates that the RFID tag 160 has been detected, it is in the POS Database 150, and it has been checked-out. In one embodiment, the foremost left and right circles represent antennas 167 from two security modules 165, respectively while the two most inner circles represent antennas 115 and 120 in kiosk 105. Although 4 small colored indicator circles are disclosed, it can be appreciated that any number, size, and/or shape of indicators can be used.

During the checkout process, the patron has the opportunity, if needed, to request assistance from an employee using call device 140. For example, the patron can use touch screen display 130 to request live audio and video assistance (i.e., checkout, product or price assistance) from an employee via a SIP (Session Initiated Protocol) telephone call. The employee assisting the patron may be located at remote call device 170, which is at a remote location from kiosk 105. The patron may not be able to see or determine where the employee is located but will be able to speak to the employee using call device 140. Call device 140 and remote call device 170 establishes a communication link that allows bilateral verbal communication between the patron and the employee even though the employee is located a distance away from kiosk 105. In one embodiment, security camera 125 is mounted on kiosk 105 and the employee can view the patron through security camera 125.

Additionally, the employee can monitor the state of RFID readers 110 and 166, processor 143, POS software 145, theft software 181, and the associated components of system 100. Furthermore, the employee can reboot any of the components of system 100 and/or system 100 and update and revise POS software 145 and/or theft software 181.

Should a patron attempt to exit the location by walking past gate module 165 without paying for items 155, RFID reader 166, which may be controlled using processor 143 and/or the theft software 181, sends control signals to instruct security camera 125 to capture an image, record the patron, initiate the audible alarm 175, and record a theft event in the POS database 150 with a time stamp and a date stamp that is associated with the RFID tags 160.

In one embodiment, if the patron exits the store without paying for item 155 at kiosk 105, the item 155 is recorded as being stolen in the POS database 150. Then, when the patron approaches the same kiosk 105 or a different kiosk 105, kiosk 105 can ask the patron to purchase item 155. Optionally, kiosk 105 and theft software 181 can also indicate to the patron that he has not purchased item 155 yet despite exiting the store. If the patron purchases item 155, the theft event in the POS database 150 with a time stamp and a date stamp that is associated with RFID tag 160 can be removed or amended to indicate that item 155 has been paid for.

In another embodiment, theft software 181 prevents redundant security notice by using an algorithm that filters out data received from RFID reader 166. For example, the user can specify the maximum amount of theft alerts that can be generated in a predetermined amount of time such as 10 theft alerts in 2 minutes.

Figure 6:
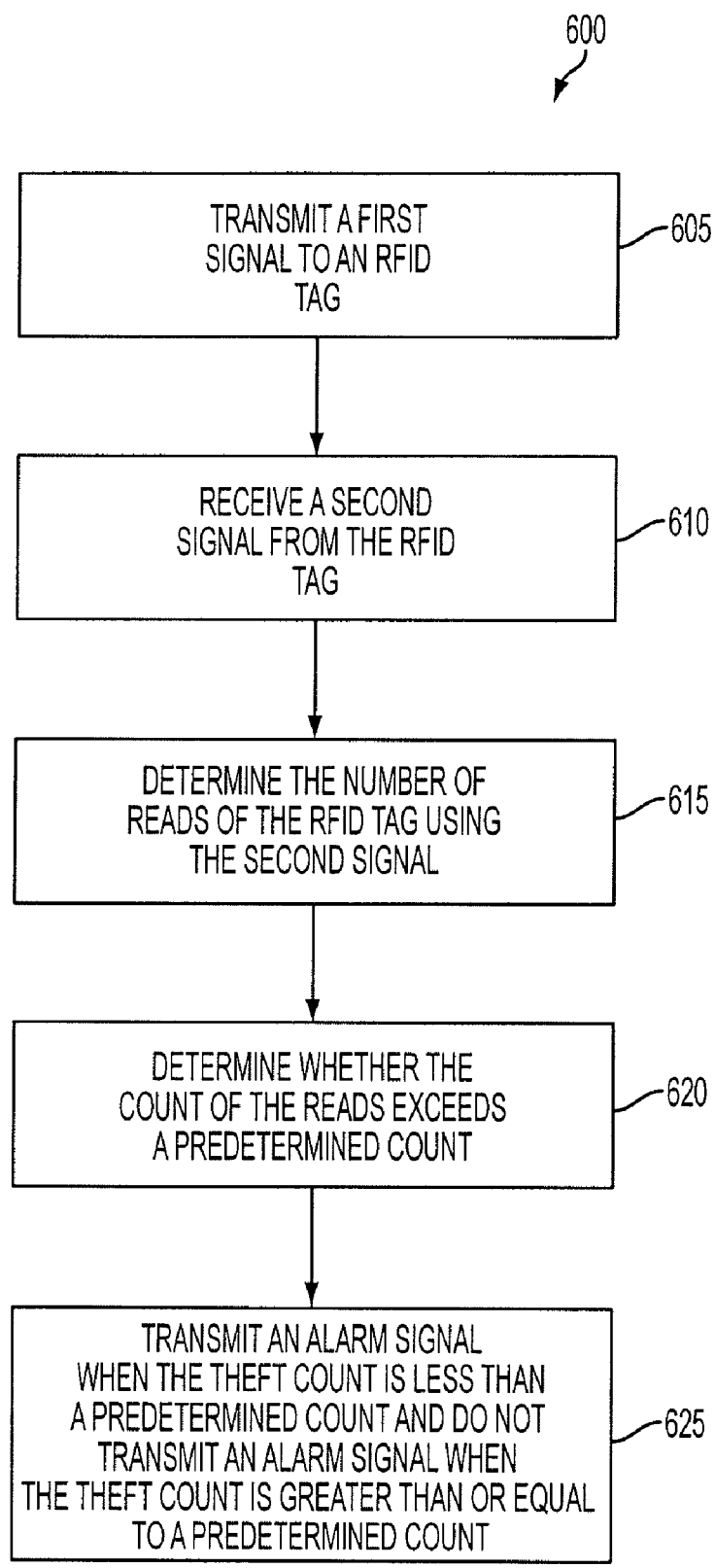
FIG. 6 is a flow chart of a method for determining when to activate an alarm when an item is determined to be stolen according to an embodiment of the invention.

FIG. 6 is a flow chart 600 of a method for determining when to activate an alarm when an item is determined to be stolen. When a patron walks out of a store with item 155 that was not paid for, RFID reader 166 transmits a TX signal to RFID tag 166 in step 605 and receives a RF signal of RFID tag 160 in step 610. Identification information of tag 160 is retrieved from POS database 150 and checked to determine if it is an item 155 from the store. If it is an item 155 from the store, theft software 181 stores the tag ID along with the current time that the tag ID was read by RFID reader 166 in a POS database 150. A theft alert counter in theft software 181 can be used to keep track of the amount of times tag ID appears in the POS database 150 within the predetermined amount of time from the current time as shown in step 615. The theft alert counter is then compared to determine if the theft alert counter exceeds the maximum amount of theft alerts or not as shown in step 620. If the theft alert counter is greater than or equal to the maximum amount of theft alerts, then no theft alert is generated by theft software 181 as shown in step 625. However, if the theft alert counter is less than the maximum amount of theft alerts, then a theft alert is generated by theft software 181 as shown in step 625.

Alternatively if the theft alert counter is greater than the maximum amount of theft alerts, no theft alert is generated for the tag ID of item 155, until a user defined "wait period" has lapsed. Once the "wait period" has lapsed, the theft alert counter is optionally reset to "0" regardless of the amount of times tag ID has appeared in the POS database 150 within the predetermined amount of time from the current time and theft alerts can resume being generated.

Advantageously this allows other tag IDs to be processed quickly by suppressing the amount of theft alerts that are generated. This is because it is likely that the store owner, employee and/or security guard would already know about the theft of item 155 after a certain number of theft alerts have been generated within a predetermined amount of time. Thus, theft software 181 can advantageously focus on processing other items resulting in greater efficiencies.

Those of ordinary skill would appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A self-checkout kiosk system, comprising:
a main housing having a first panel;
a first RF antenna positioned adjacent the first panel to transmit a TX signal toward an RFID tag corresponding to an item and to receive a RX signal from the RFID tag;
a first RFID reader positioned in the main housing and connected to the first RF antenna to detect an RFID tag using the RX signal;
a remote housing having a second panel;
a second RF antenna positioned adjacent to the second panel to transmit a TX signal toward the RFID tag and to receive a RX signal from the RFID tag;
a second RFID reader positioned in the remote housing and connected to the second RF antenna to receive the RX signal from the RFID tag;
a theft detection module connected to the first RFID reader and the second RFID reader, the theft detection module configured to:
store a description of the item corresponding to the RFID tag in a database,
track the amount of times the RFID tag is read by the first RFID reader or the second RFID reader within a predetermined amount of time using a theft alert counter, and
determine whether a theft alert count generated by the theft alert counter exceeds a maximum amount of theft alerts,
if the theft alert count is greater than or equal to the maximum amount of theft alerts then no theft alert is generated, and
if the theft alert count is less than the maximum amount of theft alerts then a theft alert is generated;
transmit a security signal in response to a determination that the theft alert count is less than the maximum amount of theft alerts; and
an alarm connected to the theft detection module, the alarm configured to activate in response to receiving the security signal from the theft detection module.

2. The self-checkout kiosk system of claim 1 further comprising a touch-screen display connected to the first RFID reader and the second RFID reader.

3. The self-checkout kiosk system of claim 2 wherein a first portion of the touch-screen display is dedicated to displaying POS transactions and online shopping and a second portion of the display is dedicated to displaying interactive digital media related to the item.

4. The self-checkout kiosk system of claim 3 wherein when the first RFID reader detects the RFID tag and when the interactive digital media related to the item is displayed, a user can interact with the touch-screen display to display a piece of content related to the item on the first portion of the touch-screen display.

5. The self-checkout kiosk system of claim 4 wherein the first portion comprises approximately 60% of the touch-screen display and the second portion comprises approximately 40% of the touch-screen display.

6. The self-checkout kiosk system of claim 2 wherein the touch-screen display displays a first indicator associated with the first RF antenna such that
the first indicator is a first indication when the RFID tag has not been detected by the first RF reader using the first RF antenna,
the first indicator is a second indication when the RFID tag is detected by the first RF reader using the first RF antenna, but the RFID tag is not stored within the database,
the first indicator is a third indication when the RFID tag is detected by the first RF reader using the first RF antenna and the RFID tag is stored within the database, but the RFID tag has not been processed for sale, and
the first indicator is a fourth indication when the RFID tag is detected by the first RF reader using the first RF antenna, the RFID tag is stored within the database, and the RFID tag has been processed for sale.

7. The self-checkout kiosk system of claim 6 wherein the touch-screen display displays a second indicator associated with the second RF antenna such that
the second indicator is a first indication when the RFID tag has not been detected by the second RF reader using the second RF antenna,
the second indicator is a second indication when the RFID tag is detected by the second RF reader using the second RF antenna, but the RFID tag is not stored within the database,
the second indicator is a third indication when the RFID tag is detected by the second RF reader using the second RF antenna and the RFID tag is stored within the database, but the RFID tag has not been processed for sale, and
the second indicator is a fourth indication when the RFID tag is detected by the second RF reader using the second RF antenna, the RFID tag is stored within the database, and the RFID tag has been processed for sale.

8. The self-checkout kiosk system of claim 7 wherein the main housing further comprises a third panel substantially perpendicular to the first panel.

9. The self-checkout kiosk system of claim 8 further comprising a third RF antenna positioned adjacent the third panel to transmit a TX signal toward a RFID tag corresponding to an item and to receive a RX signal from the RFID tag positioned adjacent the third panel.

10. The self-checkout kiosk system of claim 9 wherein the touch-screen display displays a third indicator associated with the third RF antenna such that
the third indicator is a first indication when the RFID tag has not been detected by the first RF reader using the third RF antenna,
the third indicator is a second indication when the RFID tag is detected by the first RF reader using the third RF antenna, but the RFID tag is not stored within the database,
the third indicator is a third indication when the RFID tag is detected by the first RF reader using the third RF antenna and the RFID tag is stored within the database, but the RFID tag has not been processed for sale, and
the third indicator is a fourth indication when the RFID tag is detected by the first RF reader using the third RF antenna, the RFID tag is stored within the database, and the RFID tag has been processed for sale.

11. The self-checkout kiosk system of claim 1, further comprising a call device positioned with the main housing to communicate with a remote call device positioned away from the main housing.

12. A self-checkout apparatus for detecting an RFID tag on an item, comprising:
a main housing having a first panel;
a memory located in the main housing storing a database, the memory configured to store a description of the item with the RFID tag in the database in response to the RFID tag being determined as stolen;
a processor located in the main housing, the processor configured to determine whether the RFID tag is stolen, the processor further configured to track the amount of times the RFID tag is read in the database within a predetermined amount of time using a theft alert counter, determine whether a theft alert count generated by the theft alert counter exceeds a maximum amount of theft alerts,
if the theft alert count is greater than or equal to the maximum amount of theft alerts then no security signal is generated, and
if the theft alert count is less than the maximum amount of theft alerts then a security signal is generated, and transmit a security signal in response to a determination that the theft alert count is less than the maximum amount of theft alerts;
a first RF antenna positioned adjacent the first panel to transmit a TX signal toward an RFID tag corresponding to an item and to receive a RX signal from the RFID tag;
a first RFID reader positioned in the main housing and connected to the first RF antenna and the processor, to detect an RFID tag using the RX signal;
a remote housing having a second panel;
a second RF antenna positioned adjacent to the second panel to transmit a TX signal toward the RFID tag and to receive a RX signal from the RFID tag;
a second RFID reader positioned in the remote housing and connected to the second RF antenna and the processor, to receive the RX signal from the RFID tag; and
an alarm connected to the processor and configured to be activated by the security signal.

13. The self-checkout apparatus of claim 12, wherein the first RFID reader and the second RFID reader are controlled by the processor.

14. The self-checkout apparatus of claim 12, wherein the alarm is activated upon receipt of the security signal.

15. The self-checkout apparatus of claim 14, further comprising a security camera connected to the processor to receive the security signal and to record a patron upon receipt of the security signal.

16. The self-checkout apparatus of claim 15, further comprising a call device positioned with the housing connected to the processor to communicate with a remote call device positioned away from the housing.

17. The self-checkout apparatus of claim 12, wherein when the processor determines that the RFID tag is stolen, the processor stores in a database a current time and associates the current time with the description of the item with the RFID tag.

18. The self-checkout apparatus of claim 12, further comprising a touch-screen display connected to the first RFID reader and the second RFID reader, the touch-screen display including a first portion dedicated to displaying POS transactions and online shopping and a second portion dedicated to displaying interactive digital media related to the item.

19. The self-checkout kiosk system of claim 18 wherein when the first RFID reader detects the RFID tag and when the interactive digital media related to the item is displayed, a user can interact with the touch-screen display to display a piece of content related to the item on the first portion of the touch-screen display.

20. The self-checkout kiosk system of claim 19 wherein the first portion comprises approximately 60% of the touch-screen display and the second portion comprises approximately 40% of the touch-screen display.

21. The self-checkout kiosk system of claim 18 wherein the touch-screen display displays a first indicator associated with the first RF antenna and a second indicator associated with the second RF antenna such that
- the first indicator is a first indication when the RFID tag has not been detected by the first RF reader using the first RF antenna,
- the first indicator is a second indication when the RFID tag is detected by the first RF reader using the first RF antenna, but the RFID tag is not stored within the database,
- the first indicator is a third indication when the RFID tag is detected by the first RF reader using the first RF antenna and the RFID tag is stored within the database, but the RFID tag has not been processed for sale,
- the first indicator is a fourth indication when the RFID tag is detected by the first RF reader using the first RF antenna, the RFID tag is stored within the database, and the RFID tag has been processed for sale,
- the second indicator is a first indication when the RFID tag has not been detected by the second RF reader using the second RF antenna,
- the second indicator is a second indication when the RFID tag is detected by the second RF reader using the second RF antenna, but the RFID tag is not stored within the database,
- the second indicator is a third indication when the RFID tag is detected by the second RF reader using the second RF antenna and the RFID tag is stored within the database, but the RFID tag has not been processed for sale,
- the second indicator is a fourth indication when the RFID tag is detected by the second RF reader using the second RF antenna, the RFID tag is stored within the database, and the RFID tag has been processed for sale.

22. The self-checkout kiosk system of claim 12 wherein the main housing further comprises
- a third panel substantially perpendicular to the first panel, and
- a third RF antenna positioned adjacent the third panel to transmit a TX signal toward a RFID tag corresponding to an item and to receive a RX signal from the RFID tag positioned adjacent the third panel.

23. The self-checkout kiosk system of claim 22 wherein the touch-screen display displays a third indicator associated with the third RF antenna such that
- the third indicator is a first indication when the RFID tag has not been detected by the first RF reader using the third RF antenna,
- the third indicator is a second indication when the RFID tag is detected by the first RF reader using the third RF antenna, but the RFID tag is not stored within the database,
- the third indicator is a third indication when the RFID tag is detected by the first RF reader using the third RF antenna and the RFID tag is stored within the database, but the RFID tag has not been processed for sale, and
- the third indicator is a fourth indication when the RFID tag is detected by the first RF reader using the third RF antenna, the RFID tag is stored within the database, and the RFID tag has been processed for sale.

\* \* \* \* \*